United States Patent
Danayakanakeri et al.

(10) Patent No.: US 9,092,398 B2
(45) Date of Patent: Jul. 28, 2015

(54) RESTORING EXPANDER OPERATIONS IN A DATA STORAGE SWITCH

(71) Applicant: LSI CORPORATION, San Jose, CA (US)

(72) Inventors: Giridhar Danayakanakeri, Bangalore (IN); Raghavendra C. Nagendra, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 231 days.

(21) Appl. No.: 13/767,103

(22) Filed: Feb. 14, 2013

(65) Prior Publication Data

US 2014/0229757 A1   Aug. 14, 2014

(51) Int. Cl.
*G06F 11/00* (2006.01)
*G06F 11/20* (2006.01)

(52) U.S. Cl.
CPC ................... *G06F 11/2038* (2013.01)

(58) Field of Classification Search
CPC .................................................. G06F 11/2038
See application file for complete search history.

(56) References Cited

U.S. PATENT DOCUMENTS

| | | | |
|---|---|---|---|
| 6,446,199 B1 * | 9/2002 | Howe et al. | 713/1 |
| 7,681,089 B2 * | 3/2010 | Ashmore | 714/57 |
| 7,849,248 B2 | 12/2010 | Johnson et al. | |
| 8,046,631 B2 * | 10/2011 | Jibbe et al. | 714/6.3 |
| 8,077,605 B2 * | 12/2011 | McCarty et al. | 370/225 |
| 8,244,948 B2 * | 8/2012 | Johnson et al. | 710/300 |
| 8,656,058 B2 * | 2/2014 | Johnson et al. | 710/2 |
| 9,026,704 B2 * | 5/2015 | More et al. | 710/267 |
| 2010/0185846 A1 * | 7/2010 | Fukase | 713/2 |
| 2014/0164846 A1 * | 6/2014 | Unrein et al. | 714/45 |

* cited by examiner

*Primary Examiner* — Amine Riad
(74) *Attorney, Agent, or Firm* — Duft Bornsen & Fettig

(57) ABSTRACT

Systems and methods presented herein provide for recovering a failed expander in a data storage switch to restore the switch to optimal. In one embodiment, a data storage switch includes a master expander having a first firmware module operable to link a plurality of logical volumes to at least one initiator through a first plurality of physical transceivers. The data storage switch also includes a slave expander having a second firmware module operable to link the plurality of logical volumes to the at least one initiator through a second plurality of physical transceivers. The slave expander is operable to detect a firmware failure of the master expander to link at least a portion of the logical volumes to the at least one initiator, to load a copy of second firmware module into the master expander, and to initiate the master expander to link to the logical volumes to the at least one initiator through the first plurality of physical transceivers based on the copy of the second firmware module.

20 Claims, 4 Drawing Sheets

RESTORING EXPANDER OPERATIONS IN A DATA STORAGE SWITCH

FIELD OF THE INVENTION

The invention generally relates to the field of data storage and more particular to automatically restoring operations of a failed expander in a data storage switch.

BACKGROUND

A Serial Attached Small Computer System Interface (SAS) topology commonly includes initiators (e.g., a SAS controller), switches, and target devices/disk drives (e.g., Joined Body of Disks, or "JBODs") to implement multipath and redundant configurations, such as those found in Redundant Array of Independent Disks (RAID) storage systems. Expanders are modules that are used to implement the switches and expand the topology. Generally, a switch comprises two inter-connected expanders (e.g., a master expander and a slave expander) with each expander connecting to each external connector of the switch. Thus, if one expander fails, the devices connected to the external connectors of the switch are still operable to communicate along the same connection path of the other expander, albeit in a degraded mode. Failing expanders do not automatically recover. Rather, an administrator or other user restores a failed expander via a debug communication port of the expander to correct the problem and resume operations.

SUMMARY

Systems and methods presented herein provide for automatic recovery of a failed switch from a degraded mode back to a fully operational or optimal mode. In one embodiment, a data storage switch includes a master expander having a first firmware module operable to link a plurality of logical volumes to at least one initiator through a first plurality of PHYs. The storage switch also includes a slave expander having a second firmware module operable to link the plurality of logical volumes to the initiator through a second plurality of PHYs. The slave expander is operable to detect a failure of the master expander to link at least a portion of the logical volumes to the initiator, to load a copy of the second firmware module into the master expander, and to initiate the master expander to link the logical volumes to the initiator through the first plurality of PHYs.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
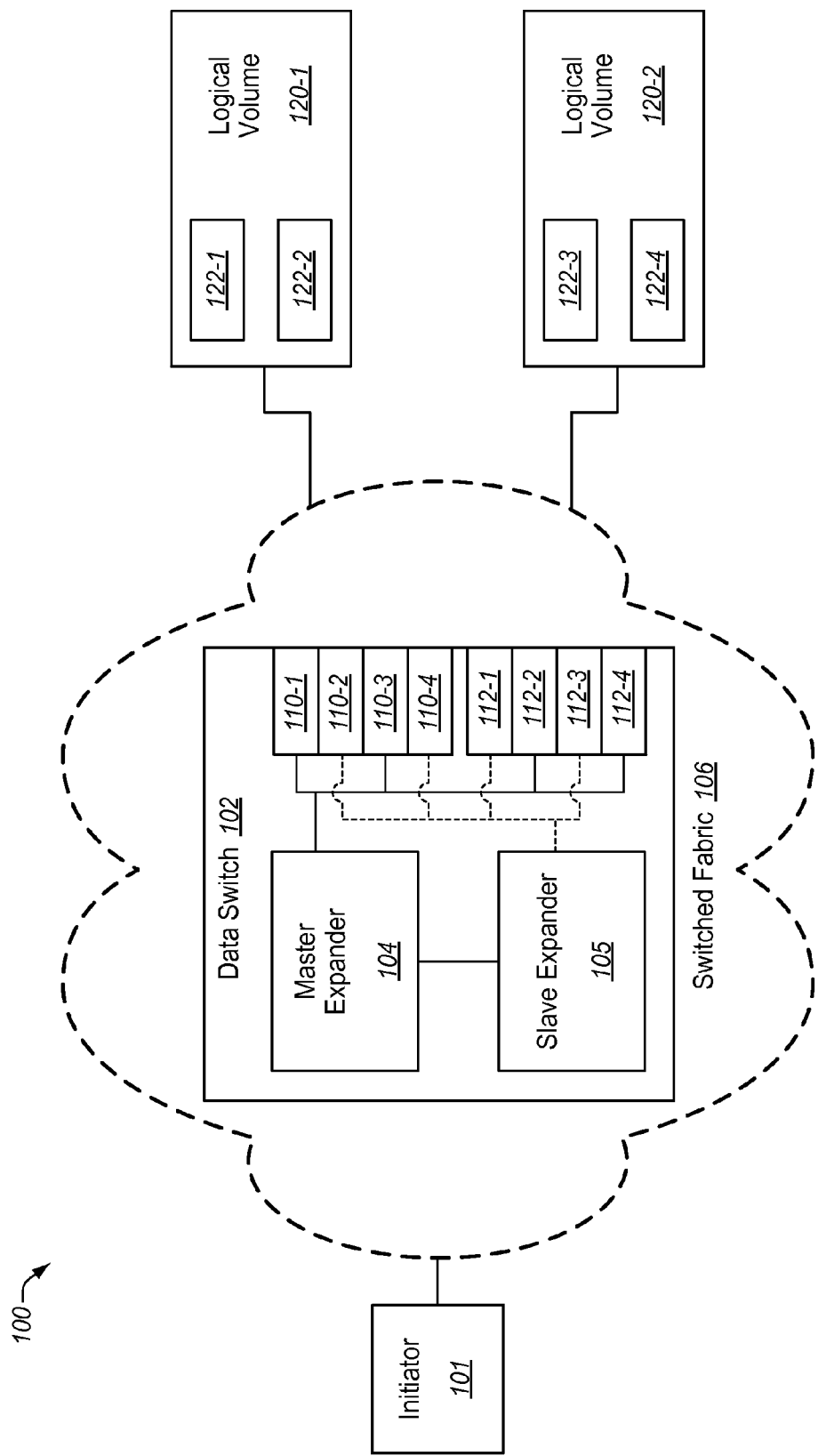
FIG. 1 is a block diagram of a storage system employing an exemplary data storage switch with multiple expanders.

FIG. 1 is a block diagram of an exemplary data switch 102 implementing a switched fabric 106 for a plurality of logical storage volumes (i.e., logical volumes 120-1-120-2), such as those found in a RAID storage system. The data switch 102 is operable to link an initiator 101 to the logical volumes 120-1-120-2 and their associated storage devices 122-1-122-4 configured therein. For example, the initiator 101 may include a storage controller, or Host Bus Adapter (HBA), that processes host I/O operations and routes or switches I/O requests thereof to communicate with one or more storage devices 122-1-122-4 via the data network of switched fabric 106. In this regard, the data switch 102 directs I/O operations of the initiator 101 to various storage regions within the storage devices 122 of the logical volumes 120. The data switch 102 is thus any device, system, software, or combination thereof operable to connect between RAID logical volumes and initiators, including to other expanders, to form the switched fabric 106 such that I/O operations to the various storage regions of the storage devices 122 (also known as "extents" or "blocks") may be performed.

The data switch 102 includes at least two expanders (e.g., a master expander 104 and a slave expander 105) operable to perform the switching of the I/O operations. One example of the expanders 104 and 105 in which the data switch 102 may be implemented is by way of a wide port Serial Attached Small Computer System Interface (SAS) expander that uses the SAS protocol to communicate between the initiator 101 and target devices (e.g., the storage devices 122-1-122-4). However, the expanders 104 and 105 may be operable to forward or otherwise route communications for the storage system according to one or more protocols including SAS, FibreChannel, Ethernet, ISCSI, etc.

The expanders 104 and 105 also employ PHYs 110-1-110-4 and 112-1-112-4 which are any combination of hardware, software, firmware, and other associated logic capable of providing physical transceivers between elements disclosed herein. The logical volumes 120 include any combination of devices, systems, and software operable to concatenate, stripe together, or otherwise combine storage partitions of disk drives into larger "virtual partitions" that can generally be resized or moved without interrupting system use. The storage devices 122 implement the storage capacity for the storage system as one or more logical volumes (e.g., the logical volumes 120-1-120-2), and may comprise any media and/or interfaces capable of storing and/or retrieving data in a computer readable format. The storage devices 122 may be magnetic hard disks, solid state drives, optical media, or the like.

The use of two expanders 104 and 105 provides redundancy to the data switch 102 while expanding its processing capabilities through a multipath configuration. For example, the master expander 104 may dictate the I/O operations through the data switch 102 with the slave expander 105 acting as a backup. If the master expander 104 fails, then the slave expander 105 can take over I/O operations for the master expander 104. But during normal operation, the slave expander 105 can be subordinately used with the master expander 104 to double the throughput of the I/O operations through the data switch 102. Upon failure of the master expander 104, the slave expander 105 assumes I/O operations of the master expander and moves to restore the I/O operations of the master expander.

Although shown or described with respect to a particular number of initiators 101, expanders 104 and 105, PHYs 110 and 112, logical volumes 120, and storage devices 122, the invention is not intended be limited to such. The embodiment shown in FIG. 1 merely illustrates one example of how expander recovery may be implemented within a data switch, such as data switch 102. Other exemplary embodiments of data switches are shown and described below. Discussion of the data switch 102 and its associated expander recovery are now directed to the flowchart of FIG. 2.

Figure 2:
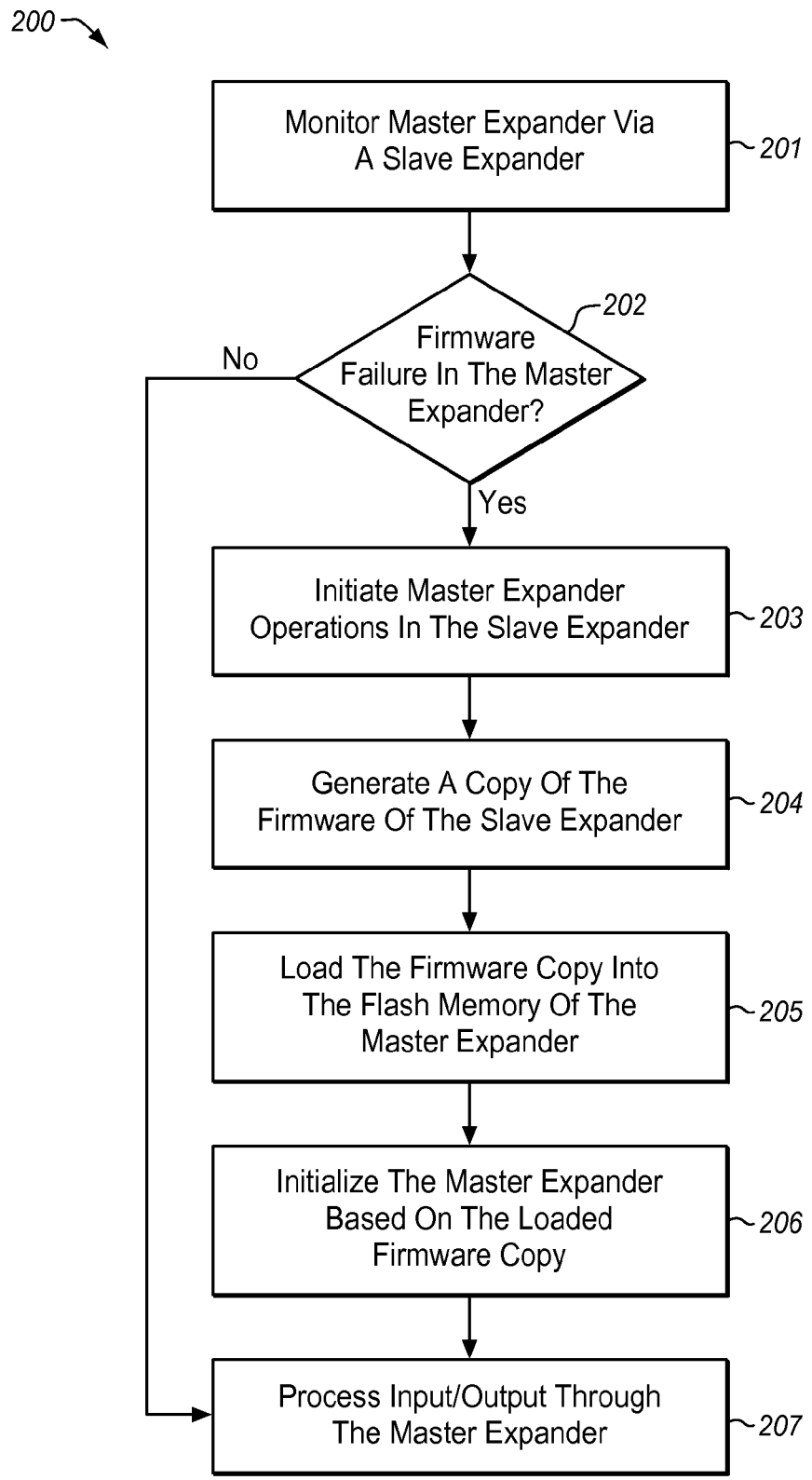
FIG. 2 is a flowchart illustrating a method of expander recovery within the data storage switch of FIG. 1.

FIG. 2 is a flowchart of an exemplary method 200 for recovering a failed expander of FIG. 1. First, it is to be assumed that the data switch 102 is operating in a fully operational mode (i.e., an optimal mode) and that the initiator 101 is performing I/O operations to the logical volumes 120-1-120-2 through the data switch 102. The master expander 104 and the slave expander 105 route the I/O operations on behalf of the data switch 102 with the master expander 104 controlling these operations.

The slave expander 105 monitors the master expander 104, in the process element 201. Based on a heartbeat sequence, the slave expander 105 may detect a firmware failure in the master expander 104, in the process element 202. For example, the slave expander 105 may monitor a "heartbeat signal" of the master expander 104. If no heartbeat is detected, then the slave expander 105 may determine that the master expander 104 has experienced a firmware failure.

If the firmware of the master expander 104 has indeed failed, the slave expander takes control and starts operating as a master expander for the data switch 102, in the process element 203. For example, the slave expander 105 may start routing the I/O operations to the storage devices 122 rather than rerouting the operations to the master expander 104, thus allowing the data switch 102 to operate in a diminished capacity.

To restore the data switch 102 to the optimal mode, the slave expander 105 generates a copy of its firmware (e.g., its I/O cache), in the process element 204, and loads the firmware copy into the flash memory of the master expander 105, in the process element 205. With the correct or otherwise uncorrupted I/O cache in place, the slave expander 105 may initialize the master expander 104, in the process element 206. In doing so, the slave expander 105 may generate a control signal that reboots the master expander 104 with the firmware copy of the slave expander 105. Thereafter, I/O operations through the master expander may once again be processed, in the process element 207.

The advantages of the data switch 102 with the slave expander 105 monitoring the I/O operations of the master expander 104 allow for the automatic recovery of the master expander 104 during a firmware failure of the master expander 104. Thus, it is no longer necessary for a user or system administrator to debug the firmware of the master expander 104. Although, it still may be possible to perform such analysis after the fact. For example, when the slave expander 105 takes control of the data switch 102, the slave expander 105 generally erases the flash memory of the master expander 104 before loading the copy of the firmware of the slave expander 105. However, the slave expander 105 may also be operable to make a copy of the firmware of the master expander 104 prior to erasing the flash memory. In doing so, the slave expander 105 may store a nonworking copy of the firmware of the master expander 104 for subsequent analysis. An example of a memory that may be used to store the nonworking copy of the firmware of the master expander 104 is illustrated in another exemplary embodiment of the data switch 102 in FIG. 3.

Figure 3:
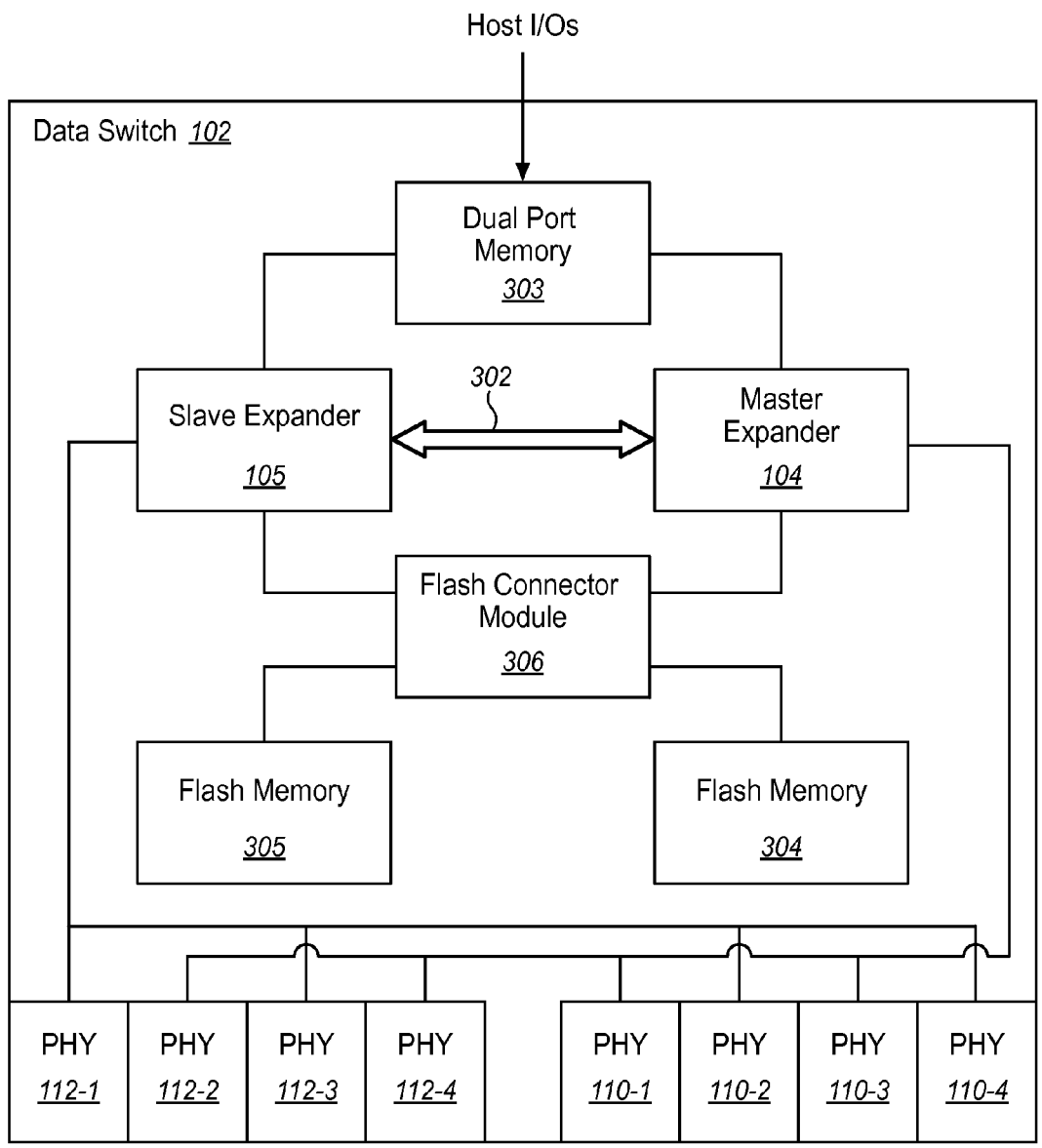
FIG. 3 is a block diagram of another exemplary data switch.

In FIG. 3, the data switch 102 again includes the slave expander 105 and the master expander 104. During normal operations, the slave expander 105 and the master expander 104 perform I/O operations starting from the initiator 101, forwarding the data to corresponding end devices (e.g., the storage devices 122 of the logical volumes 120) through the PHYs 110/112 connecting the data switch 102 to the end devices.

The slave expander 105 and the master expander 104 are interconnected through Inter-Expander Link (IEL) 302. The IEL 302 allows for inter-communications between the slave expander 105 and the master expander 104. A dual port memory 303 (e.g., Random Access Memory, or RAM, or other volatile memory) allows the slave expander 105 and the master expander 104 to monitor one another to determine expander status, pending I/Os, etc. The slave expander 105 is operable to detect the firmware failure of the master expander 104 by the manner in which the master expander 104 accesses and writes to registers in the dual port memory 303. For example, the slave expander 105 may monitor a heartbeat signal written to the dual port memory 303 by the master expander 104. Thus, when the slave expander 104 detects a problem with the master expander 105 via the dual port memory 303, the slave expander 105 takes control of the operations of the master expander 104 by sending a control signal to the master expander 104 through the IEL 302.

To illustrate, the master expander and the slave expander 105 share access to the dual port memory 303. In doing so, master expander 104 sets a flag (e.g., a logical "1" heartbeat value) in a common use register of the dual port memory 303 to indicate to the slave expander 105 that the master expander 104 is operational. The slave expander 105 detects this value and resets it (e.g., to a logical "0") to indicate to the master expander 104 that the slave expander 105 is operational. This "flip-flopping" continues during normal operations. When either expander fails, that expander is incapable of performing this setting or resetting of the heartbeat value thereby indicating that the other expander should take control of the I/O operations.

The data switch also includes a flash connector module 306 to control the flash memories 304/305 of their respective expanders 104/105. For example, after the slave expander 105 detects the firmware failure of the master expander 104, the slave expander 105 requests access to the flash memory 304 of the master expander 104 through the flash connector module 306. Once access is granted, the slave expander 105 erases the entire flash memory 304 of the master expander 104 and copies an image of the flash memory 305 of the slave expander 105 to the flash memory 304 of the master expander 104. The slave expander 105 then performs a reset on the flash memory 304 via a reset command through the flash connector module. Upon completion of the reset, the flash connector module 306 grants the master expander 104 access to its flash memory 304 to reinitialize I/O operations through the master expander 104. The flash connector module 306 during this process also ensures that the address and data lines of slave expander 105 remain operational through its PHYs 110/112. For example, the flash connector module 306 incorporates the connections of the master expander 104 to the PHYs 112/110 through which the master expander 104 was performing I/O operations.

The flash connector module 306 is also operable to prevent the master expander 104 from simply accessing the flash 305 of the slave expander 105 during a firmware failure. For example, the flash connector module 306 operates as a barrier between the two flash memories 304 and 305 to prevent one expander from inadvertently accessing the firmware of another expander and improperly continuing I/O operations.

As mentioned, the slave expander 105 may also be operable to retrieve a copy of the firmware of the master expander 104 located in the flash memory 304 for post failure analysis of the firmware. In this regard, the slave expander 105 may store a copy of the firmware into memory of the flash connector module 306 (not shown). Afterwards, a system administrator may access the copied albeit corrupted firmware of the master expander 104 to determine reasons for the failure.

Although shown or described with respect to the slave expander 105 monitoring the failure of the master expander 104, the invention is not intended to be so limited. For example, the dual port memory 303 allows each expander to monitor the other's status, capability, and failures. Accordingly, the master expander 104 already being in control of the data switch 102 may be operable to detect a failure in the slave expander 105 as such could still result in diminished capacity (i.e., a non-optimal or degraded mode) if both expanders were participating in the I/O operations. In such as a case, the master expander 104 may the access the firmware of the slave expander 105 in the flash memory 305 to erase that memory, and load the firmware of the master expander 104 located in the flash memory 304 into the flash memory 305 to reinitialize slave expander 105.

Figure 4:
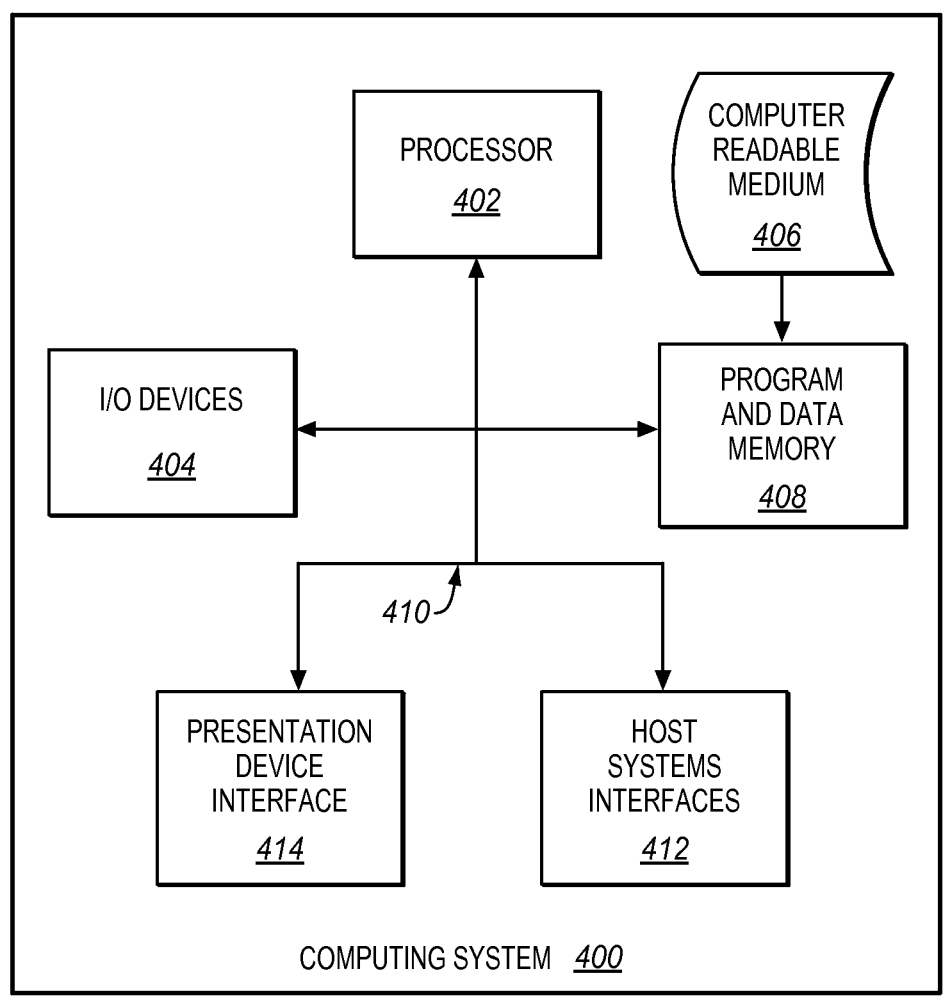
FIG. 4 illustrates a computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computing system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output or I/O devices 404 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A data storage switch, comprising:
    a master expander having a first firmware module operable to link a plurality of logical volumes to at least one initiator through a first plurality of physical transceivers;
    a slave expander having a second firmware module operable to link the plurality of logical volumes to the at least one initiator through a second plurality of physical transceivers, and
    a dual port memory communicatively coupled to the master expander and to the slave expander,
    wherein the slave expander is operable to detect, via the dual port memory, a firmware failure of the master expander to link at least a portion of the logical volumes to the at least one initiator, to load a copy of the second firmware module into the master expander, and to initiate the master expander to link the logical volumes to the at least one initiator through the first plurality of physical transceivers based on the copy of the second firmware module.

2. The data storage switch of claim 1, wherein:
    the slave expander is further operable to route the input/output operations of the master expander from the initiator through the slave expander.

3. The data switch of claim 1, wherein:
    the dual port memory is operable to store a heartbeat signal of the master expander,
    wherein the slave expander is further operable to detect the firmware failure of the master expander based on the heartbeat signal of the master expander.

4. The data storage switch of claim 1, wherein:
    the slave expander is further operable to generate a copy of the firmware of the master expander for subsequent analysis of the firmware failure of the master expander.

5. The data storage switch of claim 1, wherein:
    the slave expander is further operable to erase a flash memory of the master expander upon detecting the firmware failure of the master expander.

6. The data storage switch of claim 1, further comprising:
    a flash connector module operable to prevent access to the second firmware module of the slave expander by the master expander and to prevent access to the first firmware module of the master expander by the slave expander during an optimal mode of the data switch.

7. The data storage switch of claim 1 further comprising:
    a flash connector module operable to maintain address and data lines of the slave expander through a flash memory of the master expander after the firmware failure of the master expander.

8. A method of recovering a failed expander in a data storage switch comprising at least two expanders, the method comprising:
- monitoring, with a first expander, a heartbeat signal of a second expander in the data storage switch, wherein the heartbeat signal is stored at a dual port memory communicatively coupled to the first expander and to the second expander;
- detecting a firmware failure of the second expander based on the heartbeat signal of the second expander;
- generating a copy of firmware of the first expander;
- loading the firmware copy of the first expander into a flash memory of the second expander; and
- initializing the second expander based on the loaded firmware copy of the first expander to link logical volumes of a data storage system to an initiator through the data storage switch.

9. The method of claim 8, further comprising:
- routing input/output operations of the initiator from the second expander through the first expander.

10. The method of claim 8, further comprising:
- accessing the dual port memory to detect a firmware failure of the second expander based on the heartbeat signal of the second expander stored in the dual port memory.

11. The method of claim 8, further comprising:
- generating a copy of the firmware of the second expander for subsequent analysis of the of the firmware failure of the second expander.

12. The method of claim 8, further comprising:
- erasing the flash memory of the second expander upon detecting the firmware failure of the second expander.

13. The method of claim 8, further comprising:
- preventing access to the firmware of the first expander by the second expander; and
- preventing access to firmware of the second expander by the first expander during an optimal mode of the data switch.

14. The method of claim 8, further comprising:
- maintaining address and data lines of the first expander through a flash memory of the second expander.

15. A non-transitory computer readable medium comprising instructions, that when executed by a processor, direct the processor to recover a failed expander in a data storage switch comprising at least two expanders, the instructions further directing the processor to:
- monitor, with a first expander, a heartbeat signal of a second expander in the data storage switch, wherein the heartbeat signal is stored at a dual port memory communicatively coupled to the first expander and to the second expander;
- detect a firmware failure of the second expander based on the heartbeat signal of the second expander;
- generate a copy of firmware of the first expander;
- load the firmware copy of the first expander into a flash memory of the second expander; and
- initialize the second expander based on the loaded firmware copy of the first expander to link logical volumes of a data storage system to an initiator through the data storage switch.

16. The computer readable medium of claim 15, the instructions further directing the processor to:
- route input/output operations of the initiator from the second expander through the first expander.

17. The computer readable medium of claim 15, the instructions further directing the processor to:
- access the dual port memory to detect a firmware failure of the second expander based on the heartbeat signal of the second expander stored in the dual port memory.

18. The computer readable medium of claim 15, the instructions further directing the processor to:
- generate a copy of the firmware of the second expander for subsequent analysis of the of the firmware failure of the second expander.

19. The computer readable medium of claim 15, the instructions further directing the processor to:
- erase the flash memory of the second expander upon detecting the firmware failure of the second expander.

20. The computer readable medium of claim 15, the instructions further directing the processor to:
- prevent access to the firmware of the first expander by the second expander; and
- prevent access to firmware of the second expander by the first expander during an optimal mode of the data switch.

* * * * *